United States Patent [19]

Clerc et al.

[11] Patent Number: 4,701,028

[45] Date of Patent: Oct. 20, 1987

[54] LIQUID CRYSTAL CELL WHICH CAN HAVE A HOMEOTROPIC STRUCTURE WITH COMPENSATED BIREFRINGENCE OF SAID STRUCTURE

[75] Inventors: Jean-Frédéric Clerc, Meylan; Jean-Claude Deutsch, Grenoble, both of France

[73] Assignee: Commissariat a l'Energie Atomique, Paris, France

[21] Appl. No.: 734,484

[22] Filed: May 16, 1985

[30] Foreign Application Priority Data

May 18, 1984 [FR] France ................. 84 07767

[51] Int. Cl.⁴ ................................. G02F 1/13
[52] U.S. Cl. .................... 350/337; 350/335; 350/347 E; 350/339 R
[58] Field of Search ........... 350/337, 339 R, 335, 350/347 E

[56] References Cited

U.S. PATENT DOCUMENTS

| | | |
|---|---|---|
| 3,694,053 | 9/1972 | Kahn .................. 350/347 E |
| 3,784,280 | 1/1974 | Bigelow . |
| 3,960,438 | 6/1976 | Bonne et al. . |
| 4,385,806 | 5/1983 | Fergason ................. 350/347 R |
| 4,436,379 | 3/1984 | Funada et al. ............. 350/335 X |
| 4,443,065 | 4/1984 | Funada et al. ............. 350/347 E X |
| 4,639,090 | 1/1987 | Clerc et al. ................ 350/347 E X |

*Primary Examiner*—John K. Corbin
*Assistant Examiner*—Richard F. Gallivan
*Attorney, Agent, or Firm*—James E. Nilles

[57] ABSTRACT

Liquid crystal cell having a homeotropic structure, with compensated birefringence for said structure.

The cell comprises a liquid crystal layer which can have a homeotropic structure and electrodes located on either side of the layer and whereof at least one is transparent. It also comprises means for compensating the birefringence of the liquid crystal layer in its homeotropic structure, so that the cell has a high contrast for said structure, in the case of an oblique observation made in a given observation plane.

Application to the construction of data display means.

10 Claims, 14 Drawing Figures

FIG. 5
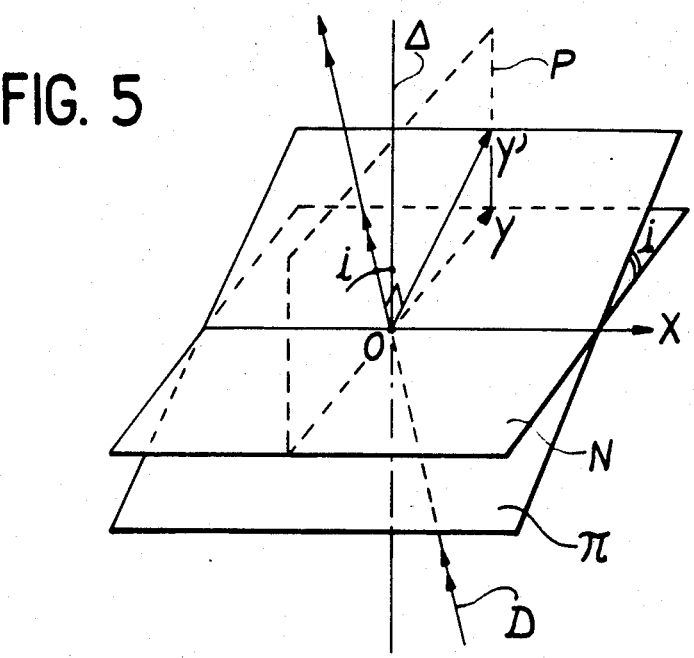
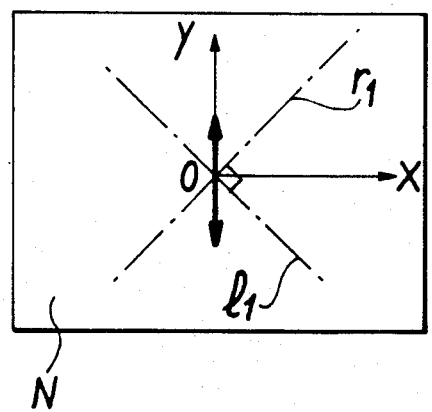
FIG. 6A
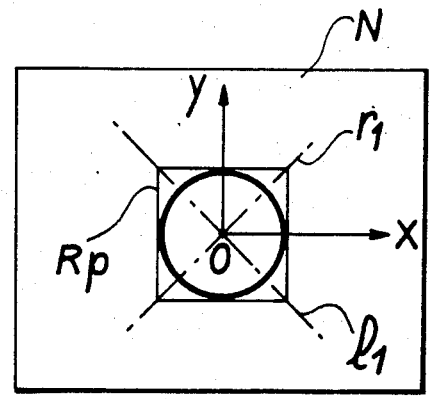
FIG. 6B

LIQUID CRYSTAL CELL WHICH CAN HAVE A HOMEOTROPIC STRUCTURE WITH COMPENSATED BIREFRINGENCE OF SAID STRUCTURE

BACKGROUND OF THE INVENTION

The present invention relates to a liquid crystal cell, which can have a homeotropic structure with a compensated birefringence for said structure. It more particularly applies to the production of data display means, such as watches or electronic pocket calculators.

Various liquid crystal displays or cells are known, examples thereof being given in FIGS. 1A to 2B. FIGS. 1A and 1B diagrammatically show a liquid crystal cell of the "helical nematic" type, which has a nematic liquid crystal layer 2 between two glass plates 3, 4 carrying not shown electrodes, as well as two linear polarizers 5, 6 arranged on either side of the assembly constituted by the layer and the two plates. The layer is arranged in such a way that the molecules 7 forming it have, when the cell is inoperative (FIG. 1A), i.e. when no voltage is applied between the electrodes, an arrangement parallel to the plates and a helical structure such that the molecules facing the polarizer for receiving an incident light are perpendicular to the maximum absorption axis of said polarizer and that the molecules facing the other polarizer are parallel to said axis, the maximum absorption axes of the polarizers also being either perpendicular (to obtain a positive black on white contrast) or parallel (to obtain a negative white on black contrast). When the cell is excited, i.e. when a voltage of an appropriate level is applied between the electrodes, the liquid crystal has a homeotropic structure, in which the molecules 7 are all parallel to the same direction 8 perpendicular to the two planes and called "homeotropy direction" (FIG. 1B).

FIGS. 2A and 2B show diagrammatically a liquid crystal cell of the "electrically controlled birefringent type", having a nematic liquid crystal layer 9 between two glass plates 10, 11, which are provided with not shown electrodes, as well as two polarizers 12, 13 arranged on either side of the assembly, constituted by the layer and the plates. The two polarizers are preferably circular or quasi-circular and complementary to one another, i.e. able to give polarization directions opposite to two light waves propagating in the same direction perpendicular to the two polarizers, and respectively falling on each of these. When the cell is inoperative, the liquid crystal has a homeotropic structure so that all the molecules 14 which form it are then parallel to the same direction 15 perpendicular to the two plates 11, 12 and also called "homeotropy direction" (FIG. 2a). When the cell is excited, the molecules are all inclined in a same direction forming an angle $\alpha$ with the homeotropy direction.

The helical nematic or electrically controlled birefringence type cells suffer from a disadvantage. When they are in their homeotropic structure and are observed obliquely, their contrast deteriorates and this increases as the observation angle increases and said contrast can even be reversed. The object of the present invention is to obviate this disadvantage.

SUMMARY OF THE INVENTION

The object of the present invention is a liquid crystal cell comprising an assembly having a liquid crystal layer which can have a homeotropic structure and electrodes located either side of the layer and whereof at least one is transparent, wherein it also comprises means for compensating the birefringence of the liquid crystal layer in its homeotropic structure, in such a way that the cell has a high contrast for said structure, in the case of an oblique observation, made in a given observation plane.

Thus, during an oblique observation (as opposed to an observation made in the homeotropy direction) the liquid crystal is birefringent in its homeotropic structure and ceases to be inactive with respect to the ellipticity of a light wave passing through it, said ellipticity being modified, which leads to a deterioration of the contrast. The compensation for a given observation plane, of the birefringence of the liquid crystal layer in its homeotropic structure, makes it possible to retain a high contrast in the case of an oblique observation made in said observation plane, and this applies for large observation angles up to 70° in the case of an electrically controlled birefringence type cell. Obviously, the electrodes can have one or more parts as a function of the nature of the information to be displayed by means of the cell.

More specifically, according to the invention, the cell is of the electrically controlled birefringence type, one of the sides of said assembly serving to be exposed to an incident light, the cell comprising at least on said side a means for polarizing the incident light, whilst the thickness of the layer and each polarization means are intended to bring about together the said compensation.

According to a special embodiment, the cell is of the electrically controlled birefringence transmissive type, the electrodes being transparent the cell comprises first and second polarization means on either side of said assembly and equivalent to quasi-circular polarizers, complementary to one another with respect to an incident plane light wave, propagating in the homeotropy direction, the observation plane being parallel thereto, each of said first and second polarization means also being able to give to a plane light wave dropping obliquely thereon in accordance with the observation plane, an elliptical polarization such that the major axis of the polarization ellipse forms an angle with the observation plane and the thickness of the liquid crystal layers is equal to double the thickness which it should have to cancel out said angle when the obliquely dropping wave has traversed the entire thickness in question.

According to a special embodiment, the first and second polarization means respectively comprise a first pair having a first linear polarizer and, between the latter and said assembly, a first delay plate, and a second pair having a second linear polarizer and, between the latter and said assembly, a second delay plate, the respective maximum absorption axes of the linear polarizers being parallel to the same plane perpendicular to the observation plane parallel to the homeotropy direction of the layer and are perpendicular to sadi homeotropy direction, each delay plate being positioned in such a way that two of its neutral lines are perpendicular to the homeotropy direction and one of the bisectors of the angle formed by these neutral lines is projected, parallel to the homeotropy direction, substantially on to the maximum absorption axis of the corresponding linear polarizer, whereby the delay plates are also positioned in such a way that their respective slow axes are located on either side of the same plane, and are chosen in such a way that the first and second pairs behave in the same way as quasi-circular polarizers which are complementary of one another with respect to an incident plane light wave propagating in accordance with the homeotropy direction.

According to another special embodiment, the two delay plates are combined into a single plate, and the bisector of the angle formed by the neutral lines of said single plate is projected parallel to the homeotropy direction substantially on to the maximum absorption axis of one of the linear polarizers.

According to another special embodiment, the cell is of the electrically controlled birefringence reflective type, one of the electrodes being optically reflecting and positioned opposite to the polarization means with respect to the liquid crystal layer, the polarization means being able to circularly polarize an incident plane light wave propagating in the homeotropy direction, the observation plane being parallel thereto, and giving to a plane light wave dropping obliquely on to it in the observation plane an elliptical polarization such that the major axis of the polarization ellipse forms an angle with the observation plane and the thickness of the liquid crystal layer is such that it cancels out the angle when the obliquely falling wave has passed through said thickness.

According to a special embodiment, the polarization means comprises a linear polarizer and, between the latter and said assembly, a delay plate, the maximum absorption axis of the linear polarizer being perpendicular to the homeotropy direction of the liquid crystal layer and perpendicular to the observation plane, the delay plate being on the one hand positioned in such a way that two of its neutral lines are perpendicular to the homeotropy direction and one of the bisectors of the angle formed by these neutral lines projected, parallel to the homeotropy direction, on to the maximum absorption axis of the linear polarizer and is on the other hand chosen so as to form, with the linear polarizer, a circular polarizer with respect to an incident plane light wave propagating in the homeotropy direction.

BRIEF DESCRIPTION OF THE DRAWINGS

The invention is described in greater detail hereinafter relative to non-limitative embodiments and the attached drawings, wherein show:

FIG. 5 a diagrammatic view of a wave plane corresponding to a plane light wave dropping obliquely to the cell shown in FIG. 4, in accordance with the observation plane shown in FIG. 3.

FIG. 6A a diagrammatic view showing the polarization of a plane light wave dropping with zero incidence on to the cell shown in FIG. 4, at the entry of the first delay plate equipping said cell.

FIG. 6B a diagrammatic view showing the polarization of said plane wave at the outlet of the first delay plate.

DETAILED DESCRIPTION OF THE PREFERRED EMBODIMENTS

Figure 1A:
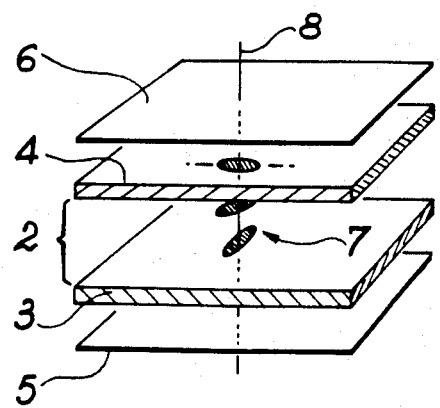
FIGS. 1A diagrammatic views of a helical nematic and 1B liquid crystal cell according to the prior art, respectively in the inoperative and excited state and which have already been described.
Figure 1B:
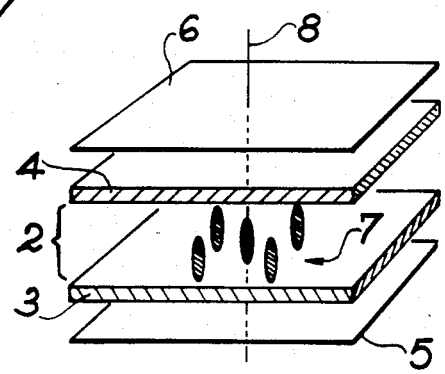
Figure 2A:
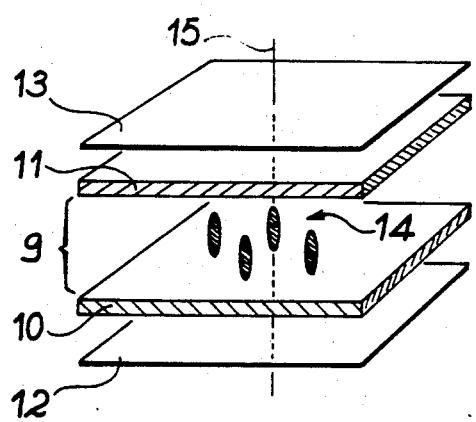
FIGS. 2A and 2B diagrammatic views of a prior art electrically controlled birefringence liquid crystal cell, respectively in the inoperative and excited state and which have already been described.
Figure 2B:
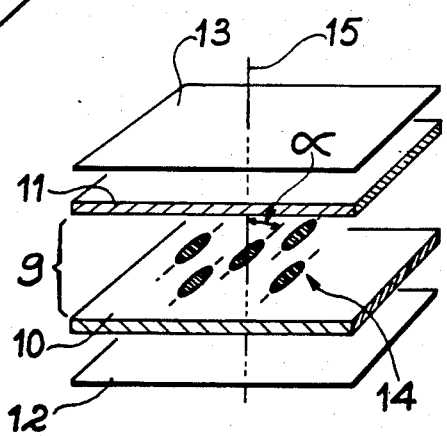
Figure 3:
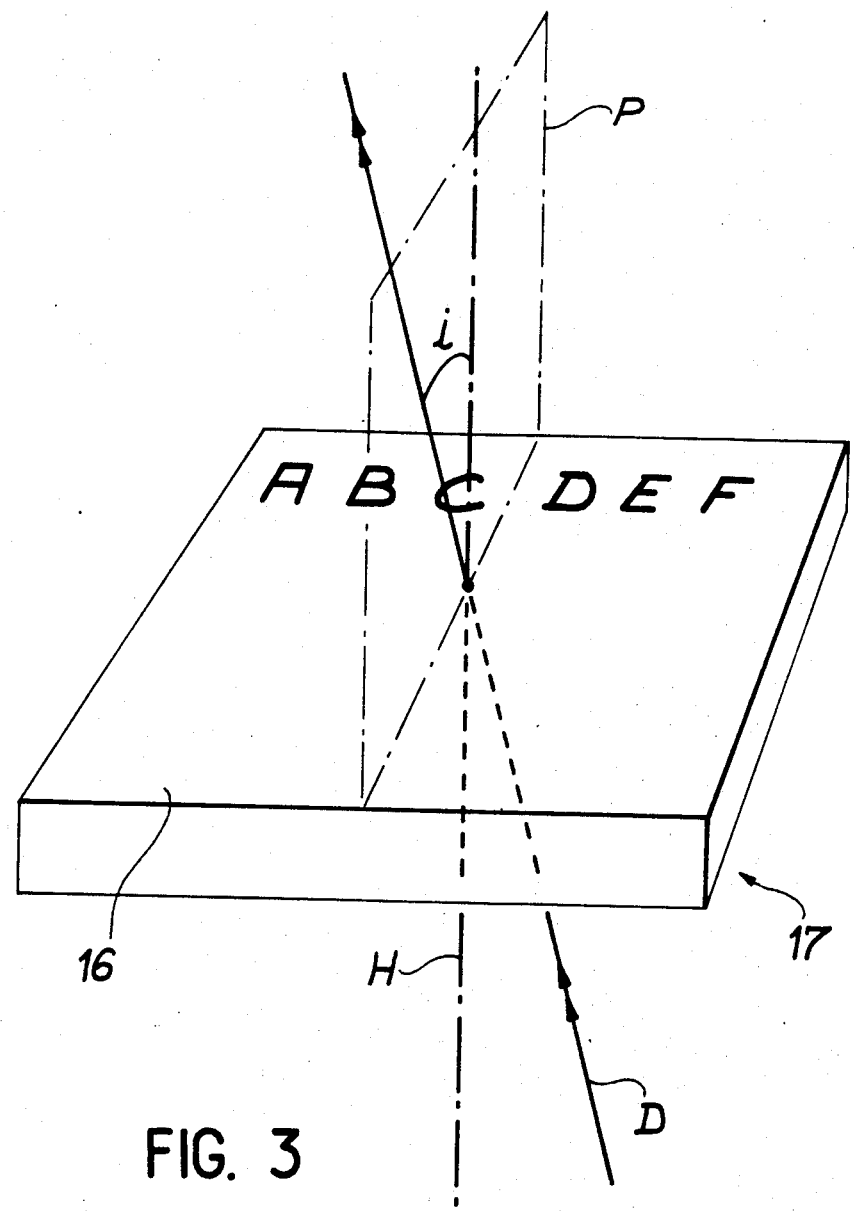
FIG. 3 a diagrammatic view showing the observation plane of a cell according to the invention and which is of the electrically controlled birefringence transmissive type.

FIG. 3 diagrammatically shows the observation plane P or main reading plane, in which is read the screen 16 of a transmissive, electrically controlled birefringence cell 17 according to the invention. The homeotropy direction H of the cell is perpendicular to the plane of the screen. The observation plane P corresponds to the most probable position of the screen reader, the latter observing the screen under a variable incidence. Plane P is perpendicular to the screen and consequently parallel to the homeotropy direction H. FIG. 3 also shows the propagation direction D of a plane light wave falling in the observation plane P on cell 17 with an angle of incidence I. The latter is in fact the angle of incidence in the active medium, whose optical index is generally close to 1.5 and which corresponds to linear polarizers, to delay plates and to the liquid crystal layer of cell 16 and which will be described hereinafter. The angle of incidence in the air, corresponding to angle i, is greater than the latter. In the propagation direction D is also the "theoretical" propagation direction for an observer, placed in said active medium.

Figure 4:
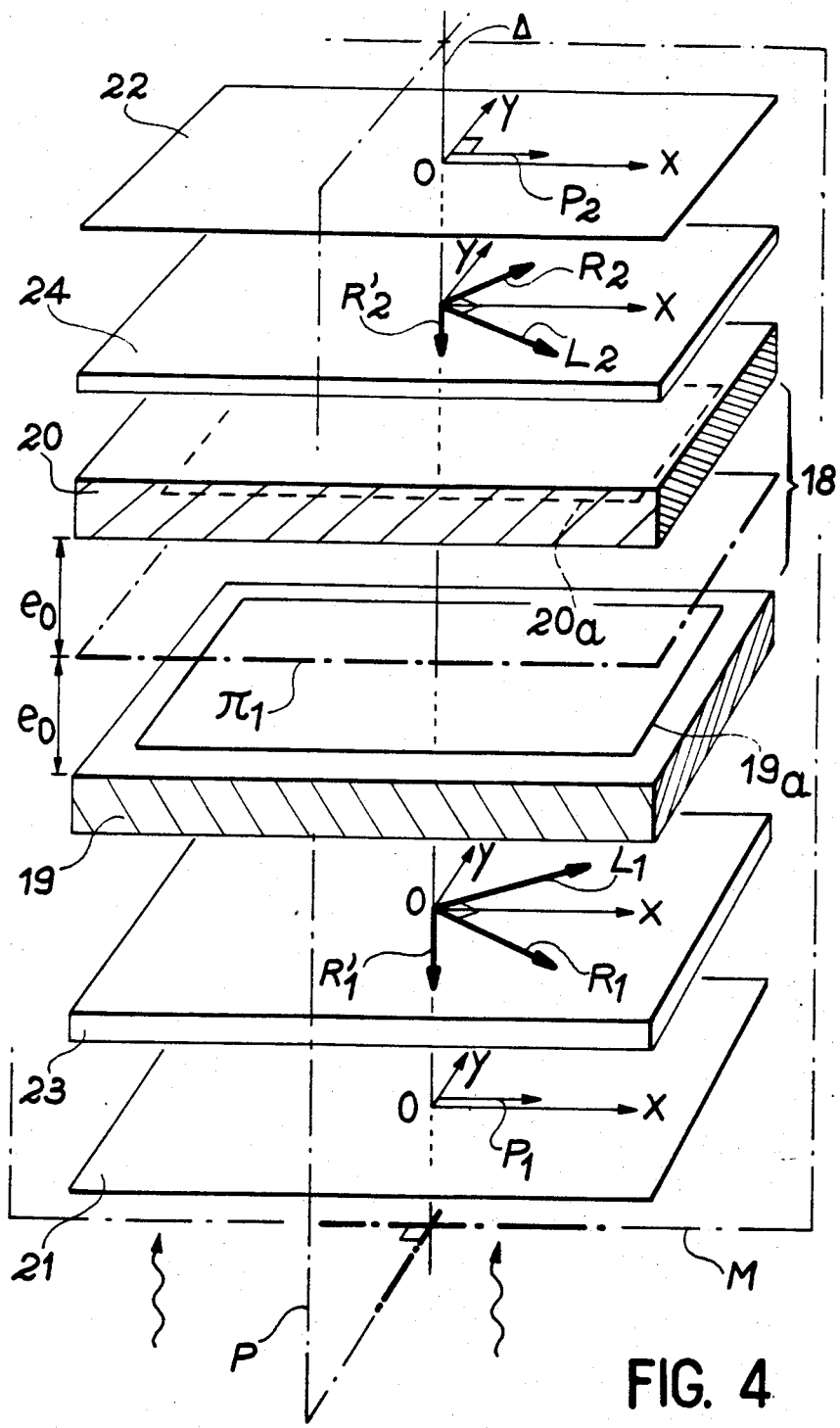
FIG. 4 a diagrammatic exploded view of the cell of FIG. 3.

FIG. 4 diagrammatically shows in exploded form the cell according to the invention, to which reference has been made in connection with the description of FIG. 3. This cell comprises a nematic liquid crystal layer 18 extending between two glass plates 19, 20, whereof the optical index is approximately 1.5. These glass plates 19, 20 behave in per se known manner on their faces, which directly face the liquid crystal layer, transparent electrodes 19a, 20a which, when an appropriate voltage is applied between them, lead to the appearance of symbols (figures, letters, dots, etc.) on the cell screen. The two plates are also parallel to one another and the liquid crystal layer is positioned between these plates so that, when no voltage is applied between the electrodes, it has a homeotropic structure, whose homeotropy direction is perpendicular to the two plates 19, 20, the molecules of the liquid crystal layer all having the same orientation with respect to the homeotropy direction when an appropriate voltage is applied between the electrodes. For this reason the cell according to the invention is described with reference to FIG. 4, is classified in the category of electrically controlled birefringence cells. This also applies with regards to the cell according to the invention described with reference to FIG. 8.

The cell of FIG. 4 also comprises on either side of and in the vicinity of the assembly constituted by the liquid crystal layer and the glass plates, a first linear polarizer 21 and a second linear polarizer 22, both being in plate form, the first polarizer 21 being located on the side of glass plate 19 which is to receive the incident light. The cell also has a first delay plate 23 positioned between plate 19 and the first polarizer 21, as well as a second delay plate 24 positioned between glass plate 20 and the second polarizer 22. Polarizers 21, 22 and delay plates 23, 24 are parallel to plates 19 and 20.

The linear polarizers 21, 22 are also disposed in such a way that their respective maximum absorption axes $P_1$ and $P_2$ are parallel to one another and parallel to a plane M perpendicular to the observation plane P and parallel to the homeotropy direction, the plane M thus intersecting the observation plane P along a straight line $\Delta$ parallel to the homeotropy direction. The delay plate 20 or 24 is positioned in such a way that two of its neutral lines, respectively corresponding to its slow axis $L_1$ or $L_2$ and to one of its fast axes $R_1$ or $R_2$ are perpendicular to the straight line $\Delta$ and that one of the bisectors formed by these neutral lines is projected, parallel to straight line $\Delta$, and substantially on to the maximum absorption axis $P_1$ or $P_2$ of the corresponding linear polarizer 21 or 22. The other fast axis $R'_1$ or $R'_2$ is then parallel to straight line $\Delta$. The delay plates are also positioned in such a way that their respective slow axes $L_1$ and $L_2$ are located on either side of plane M. Moreover, delay plates 23 and 24 are chosen in such a way that the pairs constituted by the first linear polarizer - first delay plate and the second linear polarizer - second delay plate behave in the same way as quasi-circular polarizers which are complementary to one another, with respect to an incident plane light wave propagating in the direction of straight line $\Delta$.

A definition will now be given of the thickness of the liquid crystal layer 18 leading, combined with polarizers 21, 22 and delay plates 23, 24, to a compensation of the birefringence of the liquid crystal layer, under oblique incidence and in the observation plane P. For this purpose, consideration will be given to the plane light wave of direction D in plane P (FIG. 3), as well as the mobile mark constituted by two orthogonal axes X and Y (FIG. 5), whereof the mobile intersection O belongs to the straight line $\Delta$ and both of which are perpendicular to said line $\Delta$, axis X also being perpendicular to plane P. Thus, mark X, Y defines the plane N perpendicular to line $\Delta$. Consideration will also be given to another mobile mark constituted by axis X and by an axis Y' deduced from axis Y by a rotation of axis X and of angle i. Thus, the other mark XY' is contained in a wave plane $\pi$ perpendicular to direction D.

A description will now be given of the evolution of the polarization of the light wave of direction D in mark XY'. Consideration will firstly be given to the special case of a zero incidence, corresponding to a zero angle i, i.e. a plane light wave propagating in the homeotropy direction. After traversing the first linear polarizer 21, at the inlet of the first delay plate 23, the plane light wave has a linear polarization along axis Y, as is shown by FIG. 6A, on which are also shown in mixed line form, the axes $l_1$ and $r_1$, which are projections on plane N, parallel to straight line $\Delta$ of the slow axis $L_1$ and fast axis $R_1$. At the exit from the first plate 23, the wave has a quasi-circular polarization and is polarization ellipse, which is very close to a circle, is inscribed in a rectangle $R_P$, whereof the sides are substantially equal and whereof two adjacent sides respectively have as the midperpendicular the axes X and Y (FIG. 6B).

Figure 7A:
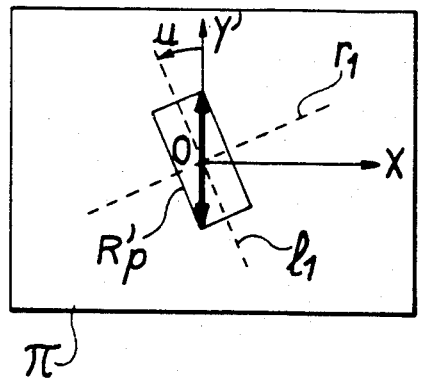
FIG. 7A a diagrammatic view showing the polarization of the plane wave dropping obliquely on to the cell of FIG. 4, at the entry of the first delay plate.

Consideration will now be given to the case where the angle i is not zero (case of the wave of direction D in FIGS. 3 and 5). After passing through the first polarizer 21 and just before entering the first delay plate 23, the wave has a linear polarization and the luminous vibration corresponding thereto is parallel to Y' and is inscribed in a rectangle $R'_p$, in accordance with one of the diagonals thereof, the axes $l_1$, $r_1$ constituting respectively the midperpendiculars of the small and large sides of rectangle $R'_p$ and axis $l_1$ forming an angle u with axis Y' (FIG. 7A).

Figure 7B:
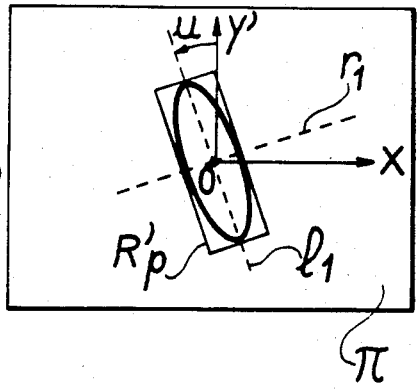
FIG. 7B a diagrammatic view showing the polarization of said wave at the exit from said first delay plate.

On leaving the first delay plate 23, the angle falling under oblique incidence is elliptically polarized and its polarization ellipse is inscribed in the rectangular $R'_p$, the major axis of the ellipse extending along axis $l_1$ and the minor axis of the ellipse extending along axis $r_1$ (FIG. 7B).

Figure 7C:
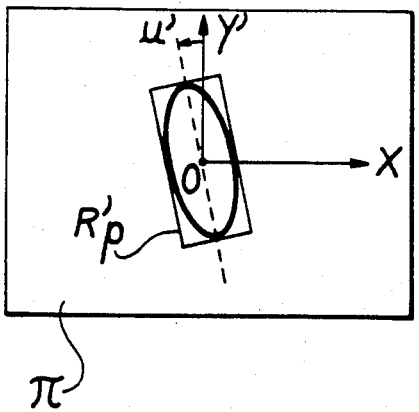
FIG. 7C a diagrammatic view showing the polarization of said wave after it has passed through a certain thickness of the liquid crystal layer.

When the wave has propagated into a certain thickness of the liquid crystal layer 18, the minor and major axes of the polarization ellipse respectively approach axis X and axis Y', the angle between the major axis of the ellipse and the axis Y' taking on a value u' below u (FIG. 7C).

Figure 7D:
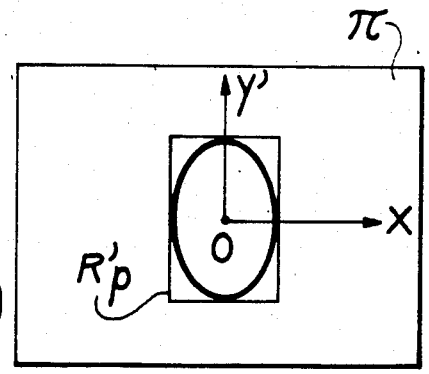
FIG. 7D a diagrammatic view showing the polarization of said wave after passing through half the liquid crystal layer, the thickness thereof being adapted so as to compensate its birefringence.

Thus, there is a particular thickness $e_O$ of the liquid crystal layer, for which the major and minor axes of the polarization ellipse are respectively located on axis Y' and on axis X, the angle between the major axis of the ellipse and axis Y' consequently being zero (FIG. 7D). According to the invention, the thickness of the liquid crystal layer 18 is taken to be double said particular thickness $e_O$, which can be determined by the Expert (using data processing simulation or by experiment). Thus, there is a total extinction of the wave on leaving the second linear polarizer 22, no matter whether the angle of incidence i is zero or is not zero. Thus, the contrast is maintained for oblique observations.

Biaxial media are preferred to uniaxial media for producing delay plates. This is justified for compensating the high optical thicknesses of the liquid crystal layer. The fast axes $R'_1$ and $R'_2$ are then respectively chosen faster than axes $R_1$ and $R_2$.

In an informative and non-limitative manner, the delay plates 23, 24 are made from 200 $\mu$m thick cellulose diacetate strips, which are drawn out so as to obtain an optical path delay of approximately 150 nm under a zero incidence. The liquid crystal can be chosen from among the family of Schiff bases and a liquid crystal layer is produced with a thickness of approximately 5 $\mu$m and whose optical anisotropy is equal to 0.2. It is also possible to choose the liquid crystal from the group of phenyl cyclohexanes, and produce a liquid crystal layer with a thickness of approximately 10 $\mu$m and an optical anisotropy of 0.1.

Figure 8:
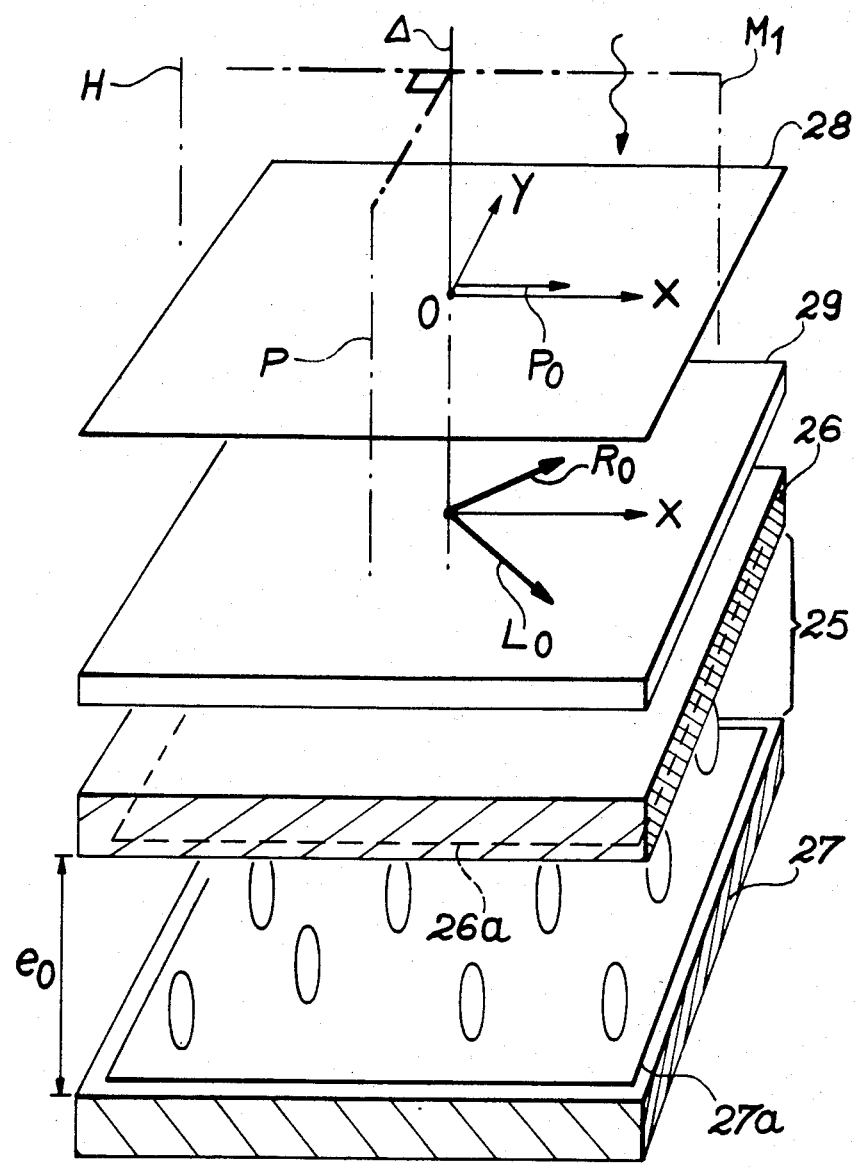
FIG. 8 a diagrammatic exploded view of an electrically controlled birefringence reflecting liquid crystal cell according to the invention.

FIG. 8 is a diagrammatic exploded view of a reflective liquid crystal cell with electrically controlled birefringence according to the invention. This cell comprises a nematic liquid crystal layer 25 between two parallel glass plates 26, 27. Glass plate 26 is provided, on its face directly facing the liquid crystal layer, with transparent electrodes 26a. The other glass plate 27 is provided on its face directly facing the liquid crystal layer with a metal and consequently optically reflecting electrode 27a. The liquid crystal layer is positioned so as to have, when no voltage is applied between the electrodes, a homeotropic structure, whose homeotropy direction is perpendicular to the two plates.

The cell shown in FIG. 8 also has a plate-like linear polarizer 28 parallel to plates 26 and 27 and positioned outside the assembly formed by the plates and the layer, in the vicinity of the plate 26 which receives the instant light, together with a delay plate 29, positioned between the linear polarizer and plate 26 and which is also parallel to said plates. The linear polarizer 28 is positioned in such a way that its maximum absorption axis zero is not only perpendicular to the homeotropy direction, but also to the observation plane P, which occupies a position comparable to that defined with reference to FIG. 3. It is then possible to consider a plane $M_1$ parallel to said axis, perpendicular to the observation plane P and parallel to the homeotropy direction H. Plane $M_1$ intersects the observation plane P along a straight line $\Delta$ parallel to the homeotropy direction. The delay plate is positioned in such a way that two of its neutral lines, which respectively correspond to the slow axis $L_O$ and to a fast axis $R_O$ of the plate, are perpendicular to the straight line $\Delta$ and one of the bisectors of the angle formed by them is projected parallel to line $\Delta$ on linear polarizer 28, following the maximum absorption axis $P_O$ thereof. In addition, delay plate 29 is chosen in such a way that, with linear polarizer 28, it forms a circular polarizer, with respect to a plane light wave falling on the linear polarizer along straight line $\Delta$.

The thickness of the liquid crystal layer 25 is made equal to the particular thickness $e_O$ referred to hereinbefore. Thus, the optically reflecting electrode 27A, in the cell shown in FIG. 8, then serves as the plane of symmetry $\pi_1$ parallel to the two glass plates 19, 20 shown in FIG. 4 and which subdivides the layer 18 of said cell into two halves of thickness $e_O$.

In this way, the birefringence of the liquid crystal layer 25 is compensated. A quarter-wave plate is preferably used for producing the delay plate. In the case of a plane light wave falling on the linear polarizer 28, then being reflected on the metal electrode 27a, and then emerging from the linear polarizer 28, it should be noted that the compensation of the birefringence of the layer, i.e. the extinction of the wave in question on leaving the linear polarizer, is only strictly obtained for a given wavelength equal to four times the optical delay brought about by the plate used.

The delay plate or plates can be realized with the aid of additional liquid crystal cells having a planar homogeneous orientation of the molecules.

It can be said that the compensation of the birefringence of the liquid crystal layers corresponds to the cells described with reference to FIGS. 4 and 8, is "external", because it is brought about by adding to the layers appropriate means on either side of said layers and without "acting" on the latter (except on their thickness).

What is claimed is:

1. A liquid crystal cell of the electrically controlled birefringence type, comprising an assembly having a liquid crystal layer which can have a homeotropic structure and electrodes located on either side of the layer and whereof at least one is transparent, wherein one of the sides of said assembly is exposed to an incident light, wherein the cell also comprises, at least on said side, a means for polarizing the incident light, and wherein the thickness of the layer and each polarization means are intended to bring about a compensation of the birefringence of the liquid crystal layer in its homeotropic structure so that the cell has a high contrast for said structure in the case of an oblique observation performed in a given observation plane.

2. A cell according to claim 1, wherein the cell is of the electrically controlled birefringence transmissive type, the electrodes being transparent, the cell comprising first and second polarization means on either side of said assembly equivalent to quasi-circular polarizers, complementary to one another with respect to an incident plane light wave, propagating in the homeotropy direction, the observation plane being parallel thereto, each of said first and second polarization means also being able to give to a plane light wave dropping obliquely thereon in accordance with the observation plane, an elliptical polarization such that the major axis of the polarization ellipse forms an angle with the observation plane and the thickness of the liquid crystal layers is equal to double the thickness which it should have to cancel out said angle when the obliquely dropping wave has traversed the entire thickness in question.

3. A cell according to claim 2, wherein the first and second polarization means respectively comprise a first pair having a first linear polarizer and, between the latter and said assembly, a first delay plate, and a second pair having a second linear polarizer and, between the latter and said assembly, a second delay plate, the respective maximum absorption axes of the linear polarizers being parallel to the same plane perpendicular to the observation plane parallel to the homeotropy direction of the layer and are perpendicular to said homeotropy direction, each delay plate being positioned in such a way that two of its neutral lines are perpendicular to the homeotropy direction and one of the bisectors of the angle formed by these neutral lines is projected, parallel to the homeotropy direction, substantially on to the maximum absorption axis of the corresponding linear polarizer, thereby the delay plates are also positioned in such a way that their respective slow axes are located on either side of the same plane, and are chosen in such a way that the first and second pairs behave in the same way as quasi-circular polarizers which are complementary of one another with respect to an incident plane light wave propagating in accordance with the homeotropy direction.

4. A cell according to claim 3, wherein the two delay plates are combined into a single plate, and the bisector of the angle formed by the neutral lines of said single plate is projected parallel to the homeotropy direction substantially on to the maximum absorption axis of one of the linear polarizers.

5. A cell according to claim 3, wherein each delay plate is produced from a biaxial material, so that its fastest neutral axis is aligned with the homeotropy direction.

6. A cell according to claim 3, wherein each delay plate is constituted by an additional liquid crystal cell, whereof the orientation of the molecules with respect to the walls of said additional cell is planar homogeneous.

7. A cell according to claim 1, wherein the cell is of the electrically controlled birefringence reflective type, one of the electrodes being optically reflecting and positioned opposite to the polarization means with respect to the liquid crystal layer, the polarization means being able to circularly polarize an incident plane light wave propagating in the homeotropy direction, the observation plane being parallel thereto, and giving to a plane light wave dropping obliquely on to it in the observation plane an elliptical polarization such that the major axis of the polarization ellipse forms an angle with the observation plane and the thickness of the liquid crystal layer is such that it cancels out the angle when the obliquely falling wave has passed through said thickness.

8. A cell according to claim 7, wherein the polarization means comprises a linear polarizer and, between the latter and said assembly, a delay plate, the maximum absorption axis of the linear polarizer being perpendicular to the homeotropy direction of the liquid crystal layer and perpendicular to the observation plane, the delay plate being on the one hand positioned in such a way that two of its neutral lines are perpendicular to the homeotropy direction and one of the bisectors of the angle formed by these neutral lines projected, parallel to the homeotropy direction, on to the maximum absorption axis of the linear polarizer and is on the other hand chosen so as to form, with the linear polarizer, a circular polarizer with respect to an incident plane light wave propagating in the homeotropy direction.

9. A cell according to claim 6, wherein the delay plate is produced from a biaxial material, such that its fastest neutral axis is aligned with the homeotropy direction.

10. A cell according to claim 6, wherein the delay plate is constituted by an additional liquid crystal cell and whereof the orientation of the molecules with respect to the walls of said additional cell is planar homogeneous.

* * * * *